(12) United States Patent
Rundels et al.

(10) Patent No.: US 6,209,947 B1
(45) Date of Patent: Apr. 3, 2001

(54) ADJUSTABLE AERODYNAMIC SYSTEM FOR A MOTOR VEHICLE

(75) Inventors: Jonathan L. Rundels, Rochester; Mark C. Trostle, Clarkston; Richard H. Altherr, Birmingham, all of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/223,624

(22) Filed: Dec. 29, 1998

Related U.S. Application Data
(60) Provisional application No. 60/070,360, filed on Jan. 2, 1998.

(51) Int. Cl.[7] ................................................ B62D 37/02
(52) U.S. Cl. ................................. 296/180.1; 296/180.5; 180/903
(58) Field of Search ........................ 296/180.1, 180.5, 296/209; 180/903

(56) References Cited

U.S. PATENT DOCUMENTS

| | | | |
|---|---|---|---|
| 4,119,339 | * 10/1978 | Heimburger | 296/1 S |
| 4,159,140 | 6/1979 | Chabot et al. | 296/1 S |
| 4,489,806 | * 12/1984 | Shimomura | 180/903 |
| 4,770,457 | * 9/1988 | Tomforde | 296/1 S |
| 4,773,692 | * 9/1988 | Schleicher et al. | 296/180.5 |
| 4,778,212 | * 10/1988 | Tomforde | 296/180.1 |
| 4,887,681 | * 12/1989 | Durm et al. | 180/68.1 |
| 4,976,489 | 12/1990 | Lovelace | 296/180.1 |
| 5,458,391 | * 10/1995 | Ito et al. | 296/180.1 |

* cited by examiner

Primary Examiner—D. Glenn Dayoan
Assistant Examiner—Jason Morrow
(74) Attorney, Agent, or Firm—Mark P. Calcaterra

(57) ABSTRACT

An adjustable aerodynamic system for a motor vehicle includes a deployable rear spoiler assembly, a deployable rocker extension assembly and a deployable air dam assembly. The deployable rear spoiler assembly includes a main body portion operatively associated with the rear deck lid and linearly translatable rearward to a deployed position. The deployable rocker extension assembly includes a lower member and an intermediate member. The lower member is driven by a ball screw motor to a deployed position and the intermediate member is downwardly spring biased so as conceal a gap created between the vehicle and the lower member upon deployment. The air dam assembly is operatively associated with the front facie and downwardly translatable to its deployed position. In the deployed position, the air dam functions to lower the front profile of the vehicle and further functions to block one or more venting passages in the front facia.

20 Claims, 6 Drawing Sheets

ADJUSTABLE AERODYNAMIC SYSTEM FOR A MOTOR VEHICLE

CROSS-REFERENCE TO RELATED APPLICATION

This application is based on provisional patent application which has been assigned U.S. Ser. No. 60/070,360 (filed Jan. 2, 1998).

BACKGROUND OF THE INVENTION

1. Technical Field

The present invention generally relates to motor vehicles. More particularly, the present invention relates to an adjustable aerodynamic system for a motor vehicle.

2. Discussion

The handling and fuel economy of a motor vehicle is significantly effected by the wind resistance it generates. A vehicle's wind resistance is often referred to as its aerodynamic efficiency. In this regard, as a motor vehicle is propelled, a resultant drag or wind resistance is encountered.

It has been long been desired to improve aerodynamic efficiency of a motor vehicle by reducing wind resistance. This is reflected in the evolution of motor vehicle design from boxier vehicles to more streamlined designs. For example, it is known to improve aerodynamic efficiency through the addition of a spoiler mounted to the rear deck lid of a vehicle. It is also known to lower front and side vehicle clearances to improve vehicle handling at faster speeds.

While known techniques for improving a vehicle's aerodynamic efficiency have proven to be commercially acceptable for their intended applications, they are all associated with limitations. For example, almost all known techniques for improving aerodynamic efficiency of a vehicle are optimized for a single vehicle speed. In addition, known structures which result in reduced vehicle clearance for high speed performance do not accommodate driving obstacles frequently encountered at low speeds. Furthermore, the limited number of structures heretofore known for improving aerodynamic efficiency of a vehicle which are deployable do not maintain overall vehicle appearance when utilized.

Thus, it is desirable to provide an improved aerodynamic system for a motor vehicle which overcomes the limitations associated with prior known arrangements.

SUMMARY OF THE INVENTION

It is a general object of the present invention to provide an adjustable aerodynamic system for a motor vehicle for improving vehicle handling and fuel efficiency.

In one form, the present invention provides an adjustable aerodynamic system for a motor vehicle including a rear deck lid and a front facia having a plurality of openings. The adjustable aerodynamic system includes a deployable rear spoiler assembly, a deployable rocker extension assembly and a deployable air dam assembly.

The rear spoiler assembly includes a main body portion movable between an undeployed position and a deployed position. The main body portion is operatively attached to the rear deck lid of the motor vehicle.

The rocker extension assembly includes a lower member and an intermediate member. The lower member downwardly translates relative to the vehicle from an undeployed position to a deployed position. The intermediate member is pivotally attached to the motor vehicle and spring biased to a downward position in which the intermediate member conceals a gap between the lower member and the vehicle when the lower member is in the deployed position.

The air dam assembly includes a main body portion operatively associated with the front facia. The main body portion downwardly translates from an undeployed position to a deployed position such that at least one of the plurality of openings in the facia is covered when the main body portion is in the undeployed position and the at least one opening is open when the main body portion is in the deployed position.

Additional benefits and advantages of the present invention will become apparent to those skilled in the art to which this invention relates from a reading of the subsequent description of the preferred embodiment and the appended claims, taken in conjunction with the accompanying drawings.

DETAILED DESCRIPTION OF THE PREFERRED EMBODIMENT

Figure 1:
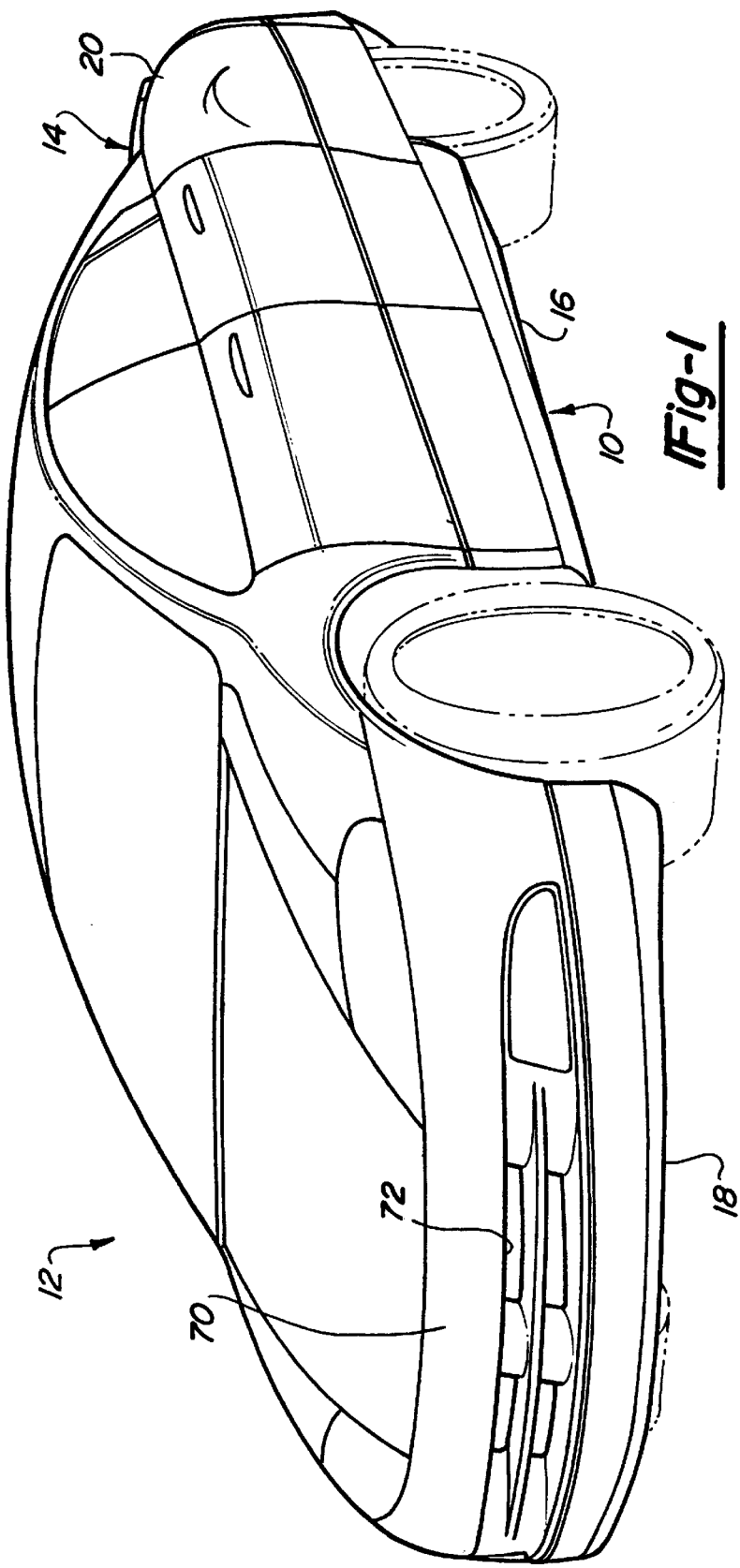
FIG. 1 is a front perspective view of an exemplary motor vehicle incorporating an adjustable aerodynamic system constructed in accordance with the teachings of a preferred embodiment of the present invention.

With initial reference to FIG. 1, an adjustable aerodynamic system constructed in accordance with the teachings of the preferred embodiment of the present invention is generally identified with reference numeral 10. The adjustable aerodynamic system 10 is shown operatively associated with an exemplary motor vehicle 12. However, it will become apparent to those skilled in the art after reading the following detailed description that the teachings of the present invention are not limited to the exemplary embodiment.

The adjustable aerodynamic system 10 is shown in FIG. 1 to generally include a deployable rear spoiler assembly 14, a deployable rocker extension assembly 16 and a deployable air dam assembly 18. These three aspects of the present invention will be described in detail below.

I. Deployable Rear Spoiler

Figure 2:
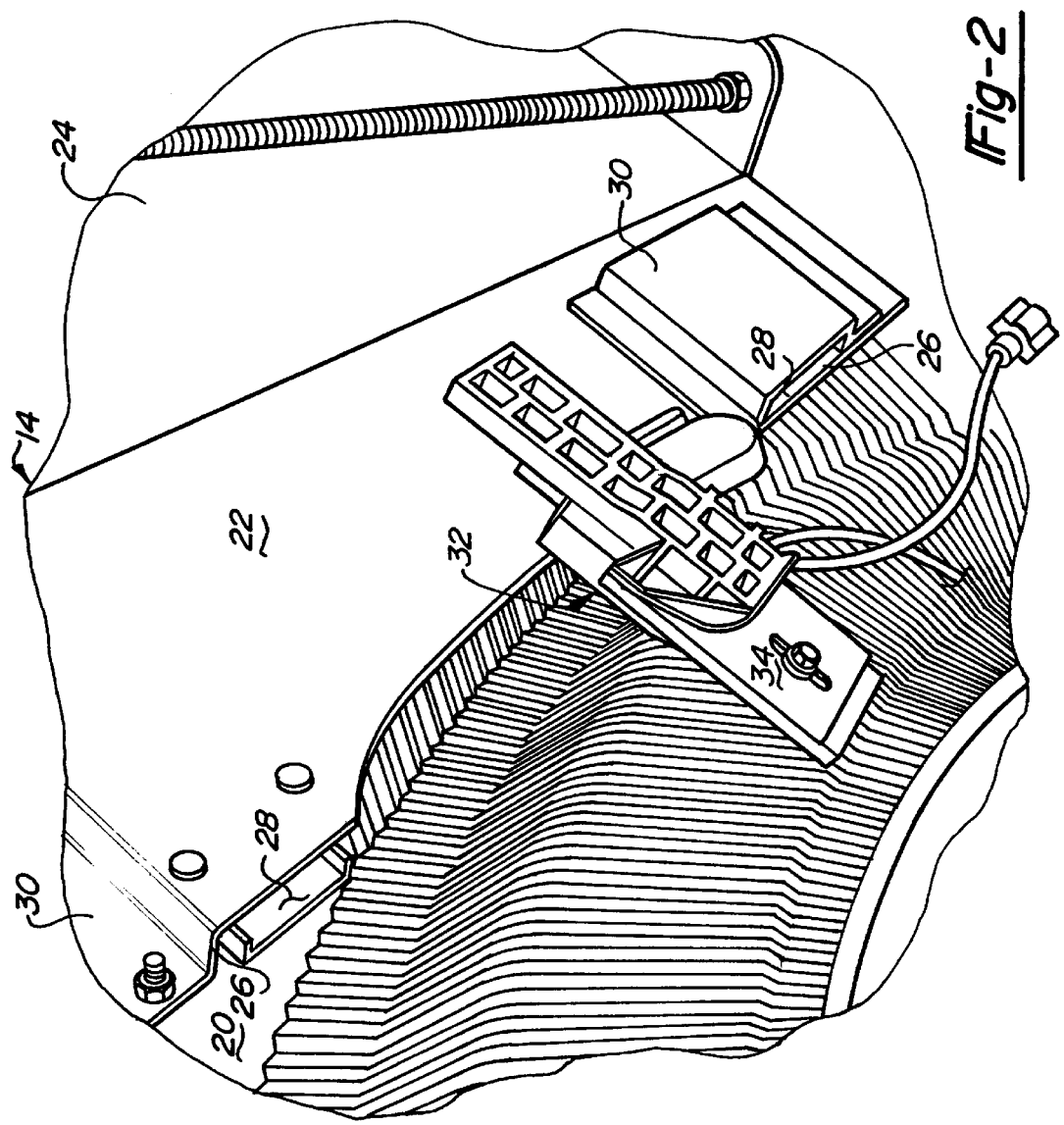
FIG. 2 is an enlarged perspective view of an underside of the rear deck lid of the exemplary motor vehicle of FIG. 1, illustrating the deployable rear spoiler of the adjustable aerodynamic system of the present invention.

The deployable rear spoiler assembly 14 of the present invention will be described with continued reference to FIG. 1 and additional reference to FIG. 2. The deployable rear spoiler assembly 14 is shown to include a main body portion or aerodynamic member 22 mounted to an underside 23 of the rear deck lid 20 and is operative for movement between a first position or undeployed position (as shown in FIG. 2) and a second position or deployed position. The main body portion 22 is adapted to extend rearwardly from the rear deck lid 20 upon deployment for purposes of enhancing aerodynamic efficiencies of the motor vehicle 12. In this regard, the main body portion 22 is adapted to extend through an elongated aperture 24 provided in the rear deck lid 20. In the stored position, the main body portion 22 is concealed under the deck lid 20.

For purposes of slidingly attaching the main body portion 22 to the deck lid 20, the deployable rear spoiler assembly 14 defines a pair of channels 26 for slidingly receiving a pair of generally rectangular guide portions 28. In the exemplary embodiment, the channels 26 are each defined by a hat-shaped member 30 which is bolted, welded, or otherwise suitably fastened to the main body portion 22. In a similar manner, the guide portions 28 are bolted, welded, or otherwise suitably fastened to the main body portion 22.

To provide means for deploying the deployable rear spoiler 22, the present invention includes a drive unit 32. The drive unit 32 includes a first portion 34 attached to the underside 23 of the deck lid 20 and a second portion 36 attached to the main body portion 22. An electric motor of the drive unit 32 is powered by the motor vehicle electrical system and functions to translate the second portion 36 relative to the first portion 34. It will be understood that the drive unit is conventional in construction and exemplary in nature.

II. Deployable Rocker Extension

With continued reference to FIG. 1 and additional reference to FIGS. 3 and 4, the deployable rocker extension assembly 16 of the present invention will be described. The rocker extension assembly 16 is shown to generally include a lower member 40 and an intermediate member 42.

Figure 3:
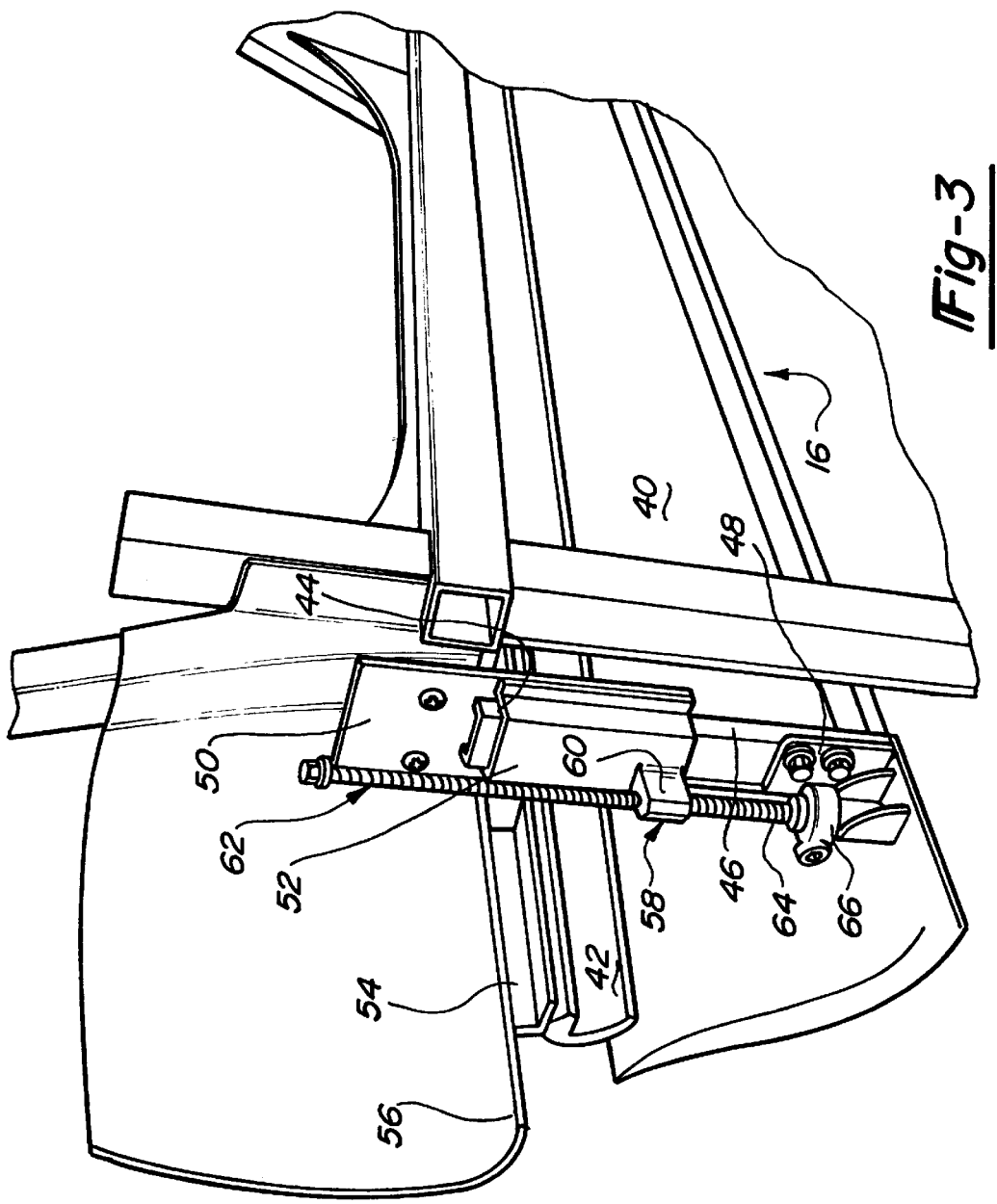
FIG. 3 is a rear perspective view of a portion of the exemplary motor vehicle of FIG. 1, illustrating the deployable rocker extension assembly of the adjustable aerodynamic system of the present invention in a deployed position.
Figure 4:
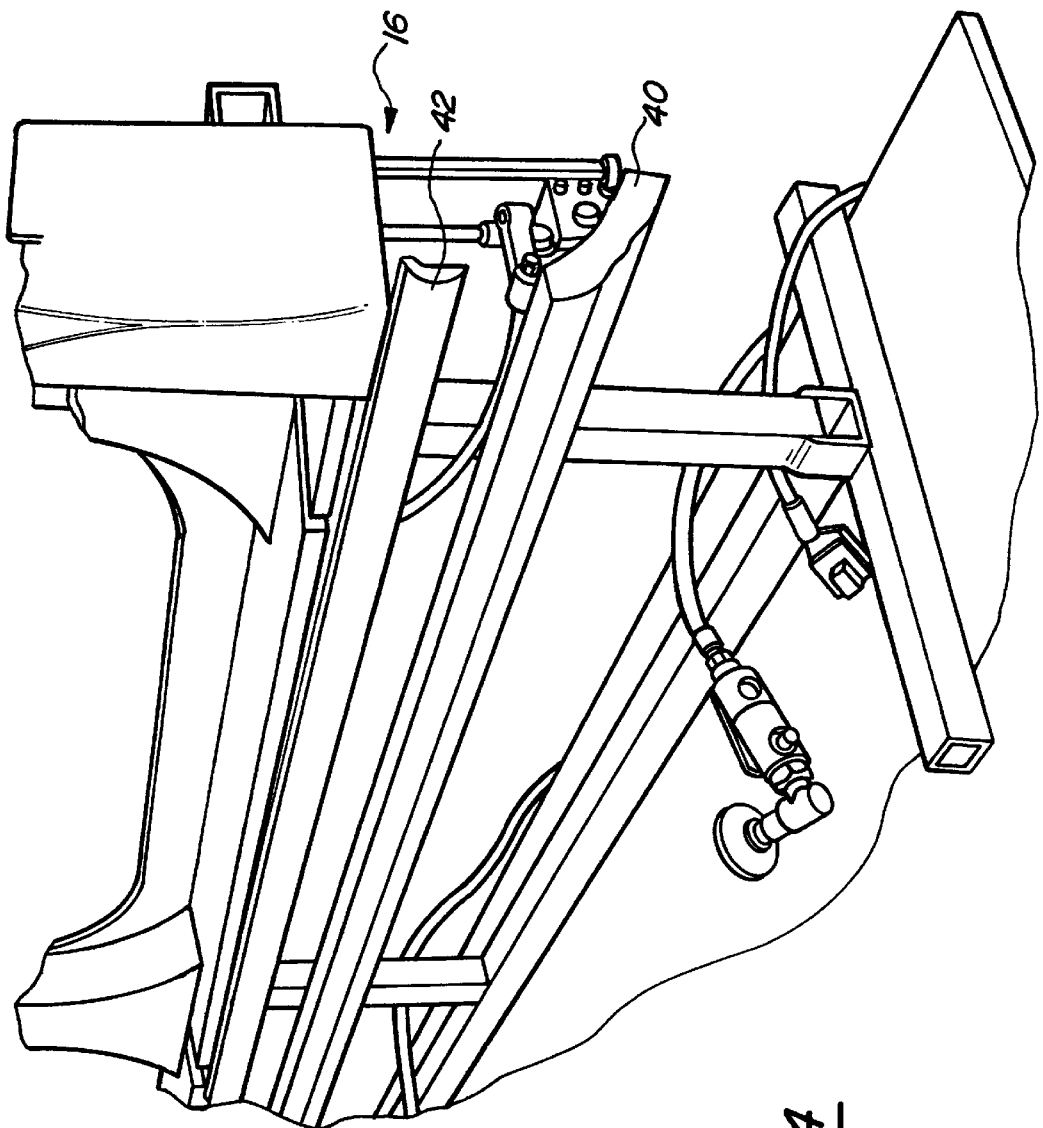
FIG. 4 is a front perspective view of the deployable rocker extension assembly of FIG. 3 shown in an intermediate position.

The lower member 40 is downwardly displaceable relative to a body 43 of the motor vehicle 12 from a first position or undeployed position (as shown in FIG. 1) to a second position or deployed position (as shown in FIG. 3). A position intermediate thereto is shown in FIG. 4. For purposes of movable interconnecting the lower member 40 with the remainder of the vehicle 12, the vehicle 12 defines a channel 44 which slidably receives a generally rectangular guide portion 46. The generally rectangular guide portion 46 is bolted or otherwise suitably fastened to the lower member 40 through a mounting plate 48. The channel 44 which slidably receives the guide portion 46 is shown in the exemplary embodiment to be defined by a backing plate 50 carried by the vehicle 12 and a generally hat-shaped portion 52 welded or otherwise suitably affixed thereto.

The intermediate portion 42 is pivotally attached to a mounting flange 54 which is in turn fixedly attached to the vehicle 12. In the exemplary embodiment, the intermediate portion 42 is spring biased downwardly so as to substantially conceal a gap 56 created between the vehicle 12 and the lower member 40 upon deployment. The spring bias is provided through a spring (not shown) or other known structure.

For purposes of translating the lower member 40 between the undeployed and deployed positions, the deployable rocker extension assembly 16 includes a drive unit 58. In the exemplary embodiment illustrated, the drive unit 58 comprises an internally threaded sleeve 60 shown interconnected to the vehicle 12 through fixed attachment to the hat-shaped portion 52. The threaded sleeve 60 receives an externally threaded rod 62 which has a lower end 64 in operable engagement with a ball screw motor 66. The ball screw motor 66 is substantially of conventional construction and may be operated electrically, pneumatically, or otherwise.

When the ball screw motor 66 rotates the threaded rod 62 in a first direction, the threaded rod 62 advances the guide portion 46 downwardly and the lower member 42 is moved towards the deployed position. Conversely, when the ball screw motor 66 rotates the threaded rod 62 in the opposite direction, the threaded rod 62 advances the guide portion 46 upward and the lower member 40 is moved toward its undeployed position.

III. Deployable Air Dam Assembly

Figure 5:
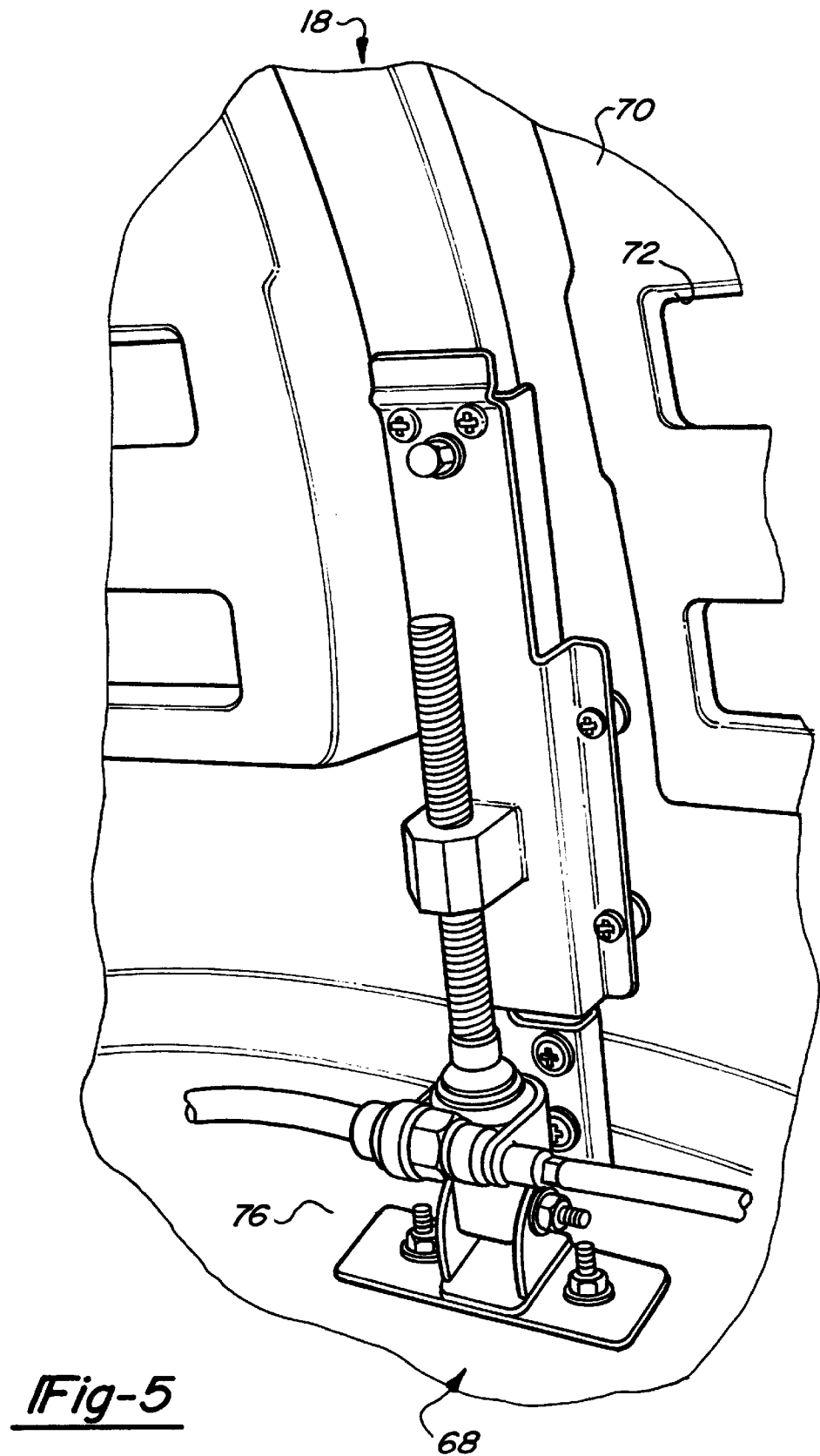
FIG. 5 is an enlarged view of a portion of the exemplary motor vehicle of FIG. 1 illustrating the deployable air dam assembly of the adjustable aerodynamic system of the present invention shown operatively associated with the front facia in a deployed position.
Figure 6:
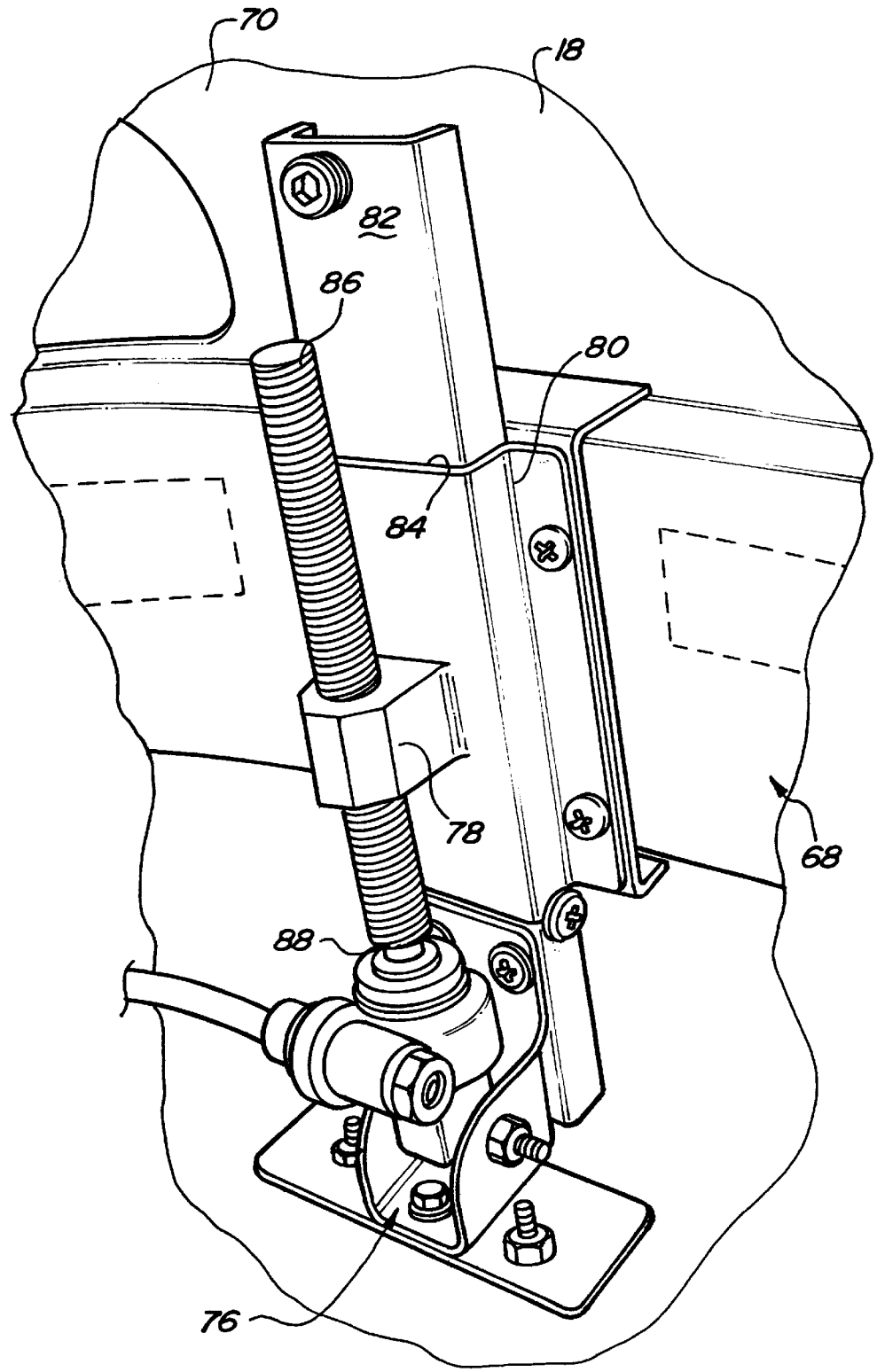
FIG. 6 is a view similar to FIG. 5 illustrating the deployable air dam assembly in an undeployed position.

With continued reference to FIG. 1 and additional reference to FIGS. 5 and 6, the deployable air dam assembly 18 of the present invention will now be described. The air dam assembly 18 includes a main body portion 68 movable relative to a front facia 70 of the motor vehicle 12 between an undeployed position (as shown in FIGS. 1 and 6) and a deployed position (as shown in FIG. 5). As will become apparent below, the main body portion 68 is operative in the deployed position to reveal a portion of the openings 72 in the front facia 70 and lower the profile of the front end of the vehicle 12.

For purposes of translating the main body portion 68 between the undeployed and deployed positions, the deployable air dam assembly 18 includes a drive unit 76. In the exemplary embodiment illustrated, the drive unit 76 comprises an internally threaded sleeve 78 welded or otherwise secured to a hat-shaped portion 80. The hat-shaped portion is in turn secured with threaded fasteners or otherwise to the facia 70. A generally rectangular guide portion 82 is bolted or otherwise suitably secured to a bracket assembly 83 which is in turn fastened to the main body portion 68. The guide portion 82 is received within a channel 84 defined by the hat-shaped portion 80 and the facia 70. The threaded sleeve 78 receives an externally threaded rod 86 which has a lower end 88 in operable engagement with a ball screw motor 90. The ball screw motor 90 is substantially of conventional construction and may be operated electrically, pneumatically or otherwise.

When the ball screw motor 90 rotates the threaded rod 86 in a first direction, the threaded rod 86 advances the main body portion 68 downward toward the deployed position. Conversely, when the ball screw motor 90 rotates the threaded rod 86 in the opposite direction, the threaded rod 86 advances the main body portion 68 upward toward its undeployed position.

In the exemplary embodiment illustrated, the motors which control actuation of the deployable rear spoiler assembly 14, deployable rocker extension assembly 16 and deployable air dam assembly 18 are controlled by a single switch located in the passenger compartment of the vehicle 12. Alternatively, it will be understood that the motors may be operated by independent switches. Further alternatively, it will be understood that the motors can be automatically actuated in a conventional manner at a predetermined vehicle speed.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

We claim:

1. An aerodynamic system for a motor vehicle including a rear deck lid and a front facia having a plurality of openings, the adjustable aerodynamic system comprising:
   a rear spoiler assembly including a main body portion movable between an undeployed position and a deployed position, the main body portion being operatively attached to the rear deck lid of the motor vehicle;
   a rocker extension assembly including a lower member and an intermediate member, the lower member downwardly translatable relative to the vehicle from an undeployed position to a deployed position, the intermediate member pivotally attached to the motor vehicle; and
   an air dam assembly including a main body portion operatively associated with the front facia, said main body portion downwardly translatable from an undeployed position to a deployed position such that at least one of the plurality of openings in the facia is covered when said main body portion is in said undeployed position and said at least one opening is opened when said main body portion is in said deployed position.

2. An aerodynamic system in combination with a motor vehicle including a rear deck lid, the adjustable aerodynamic system comprising:
   a rear spoiler assembly including a main body portion movable between an undeployed position and a deployed position, the main body portion being operatively attached to the rear deck lid of the motor vehicle;
   wherein said main body portion is mounted to an underside of said deck lid and rearwardly extends from said undeployed position to said deployed position.

3. The aerodynamic system for a motor vehicle of claim 2, further comprising:
   a pair of channels secured to said main body portion; and
   a pair of guide portions carried by said vehicle, each guide portion of said pair of guide portions being slidably disposed with one of said pair of channels.

4. The aerodynamic system for a motor vehicle of claim 3, wherein each of said pair of channels is generally hat-shaped.

5. An aerodynamic system in combination with a motor vehicle, the adjustable aerodynamic system comprising:
   a rocker extension assembly including a lower member and an intermediate member, the lower member downwardly translatable relative to the vehicle from an undeployed position to a deployed position, said intermediate member movable between an upper position and a lower position.

6. The aerodynamic system for a motor vehicle of claim 5, wherein said intermediate member functions to conceal a gap between said motor vehicle and said lower member when said lower member is in said deployed position.

7. The aerodynamic system for a motor vehicle of claim 6, wherein said intermediate member is pivotally attached to the motor vehicle.

8. The aerodynamic system for a motor vehicle of claim 5, wherein the motor vehicle defines a channel and further comprising a guide portion carried by said lower member, said guide portion being slidably received within said channel.

9. The aerodynamic system for a motor vehicle of claim 5, further comprising a drive unit for translating said lower member between said undeployed and said deployed positions.

10. The aerodynamic system for a motor vehicle of claim 9, wherein the drive unit includes an internally threaded sleeve interconnected to one of the motor vehicle and the lower member, a motor attached to the other of the motor vehicle and the lower member, and a threaded rod operatively engaged with said motor and in threaded engagement with said sleeve.

11. The aerodynamic system for a motor vehicle of claim 10, wherein said motor is attached to said lower member.

12. The aerodynamic system for a motor vehicle of claim 10, wherein said motor is a ball screw motor.

13. An aerodynamic system in combination with a motor vehicle including a front facia having a plurality of openings, the adjustable aerodynamic system comprising:
   an air dam assembly including a main body portion operatively associated with the front facia, said main body portion downwardly translatable from an undeployed position to a deployed position such that at least one of the plurality of openings in the facia is covered when said main body portion is in said undeployed position and said at least one opening is opened when said main body portion is in said deployed position.

14. The aerodynamic system for a motor vehicle of claim 13, further comprising a drive unit for translating said main body portion between said undeployed and said deployed positions.

15. The aerodynamic system for a motor vehicle of claim 14, wherein the drive unit includes an internally threaded sleeve interconnected to one of the motor vehicle and the main body portion, a motor attached to the other of the motor vehicle and the main body portion, and a threaded rod operatively engaged with said motor and in threaded engagement with said sleeve.

16. The aerodynamic system for a motor vehicle of claim 15, wherein said motor is attached to said main body portion.

17. The aerodynamic system for a motor vehicle of claim 15, wherein said motor is a ball screw motor.

18. An aerodynamic system in combination with a motor vehicle including a rear deck lid, the adjustable aerodynamic system comprising:
   a rear spoiler assembly including a main body portion movable between an undeployed position and a deployed position, the main body portion being operatively attached to the rear deck lid of the motor vehicle;
   wherein said main body portion is mounted to an underside of said deck lid;
   a pair of channels secured to said main body portion; and
   a pair of guide portions carried by said vehicle, each guide portion of said pair of guide portions being slidably disposed with one of said pair of channels.

19. The aerodynamic system for a motor vehicle of claim 18, wherein said main body portion rearwardly extends from said undeployed position to said deployed position.

20. The aerodynamic system for a motor vehicle of claim 18, wherein each of said pair of channels is generally hat-shaped.

* * * * *